United States Patent
Shimizu

(10) Patent No.: US 10,250,604 B2
(45) Date of Patent: Apr. 2, 2019

(54) STORAGE MEDIUM, INFORMATION-PROCESSING DEVICE, INFORMATION-PROCESSING SYSTEM, AND NOTIFICATION METHOD

(71) Applicant: NINTENDO CO., LTD., Kyoto (JP)

(72) Inventor: Takao Shimizu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 256 days.

(21) Appl. No.: 14/718,463

(22) Filed: May 21, 2015

(65) Prior Publication Data

US 2015/0350307 A1 Dec. 3, 2015

(30) Foreign Application Priority Data

May 29, 2014 (JP) .................. 2014-111421

(51) Int. Cl.
*H04L 12/58* (2006.01)
*H04L 29/06* (2006.01)
*H04L 29/08* (2006.01)
*H04L 12/815* (2013.01)

(52) U.S. Cl.
CPC .............. *H04L 63/10* (2013.01); *H04L 47/22* (2013.01); *H04L 51/04* (2013.01); *H04L 51/32* (2013.01); *H04L 63/08* (2013.01); *H04L 67/24* (2013.01); *H04L 67/306* (2013.01); *H04L 51/24* (2013.01)

(58) Field of Classification Search
CPC ..... H04L 67/306; H04L 51/32; H04L 12/581; H04L 51/04; H04L 67/24; H04L 67/22
See application file for complete search history.

(56) References Cited

U.S. PATENT DOCUMENTS

| | | | | |
|---|---|---|---|---|
| 8,144,006 B2* | 3/2012 | Thomas | ............... | H04L 12/587 340/539.1 |
| 8,979,647 B2* | 3/2015 | Ostergren | ............. | A63F 13/533 463/29 |
| 2002/0094069 A1 | 7/2002 | Takahashi et al. | | |
| 2007/0093958 A1* | 4/2007 | Jonsson | ................ | G01C 21/36 701/431 |
| 2008/0069316 A1* | 3/2008 | Walter | ............. | H04M 3/42238 379/88.18 |

FOREIGN PATENT DOCUMENTS

| | | |
|---|---|---|
| JP | 2002-204288 | 7/2002 |
| JP | 2003-178005 | 6/2003 |
| JP | 2004-199382 | 7/2004 |
| JP | 2004-350226 | 12/2004 |

* cited by examiner

*Primary Examiner* — John M Macilwinen
(74) *Attorney, Agent, or Firm* — Nixon & Vanderhye, P.C.

(57) ABSTRACT

An example information-processing device, when accepting a login from a user (SA1), executes a first processing (SA2). The first processing is, for example, execution of a game. The example information-processing device, when receiving, for example, a signal for having a chat (SA3), determines whether a destination user of the signal is a logged-in user (SA4). The example information-processing device, when the destination user is not a logged-in user, notifies the logged-in user of the receipt of the signal by displaying an icon (SA6). When doing so, the example information-processing device displays information on the destination user, without displaying a source user of the signal.

9 Claims, 3 Drawing Sheets

STORAGE MEDIUM, INFORMATION-PROCESSING DEVICE, INFORMATION-PROCESSING SYSTEM, AND NOTIFICATION METHOD

CROSS REFERENCE TO RELATED APPLICATIONS

The disclosure of Japanese Patent Application No. 2014-111421, filed on May 29, 2014, is incorporated herein by reference.

FIELD

The exemplary embodiment relates to a notification made to a user sharing a device with another user.

BACKGROUND AND SUMMARY

Sharing a device such as a communication terminal between users commonly requires restriction of access to personal data stored in the device.

An exemplary embodiment provides a non-transitory storage medium storing a program for causing a computer to execute a process, the process including: accepting a login from a first user; executing a first processing; detecting receipt of data relevant to a second user different from the first user, the first user being logged in, while the first processing is running; and executing a second processing to notify the first user, the first user being logged in, of information relevant to the detected receipt of the data.

DETAILED DESCRIPTION OF NON-LIMITING EXAMPLE EMBODIMENTS

Exemplary Embodiment

Figure 1:
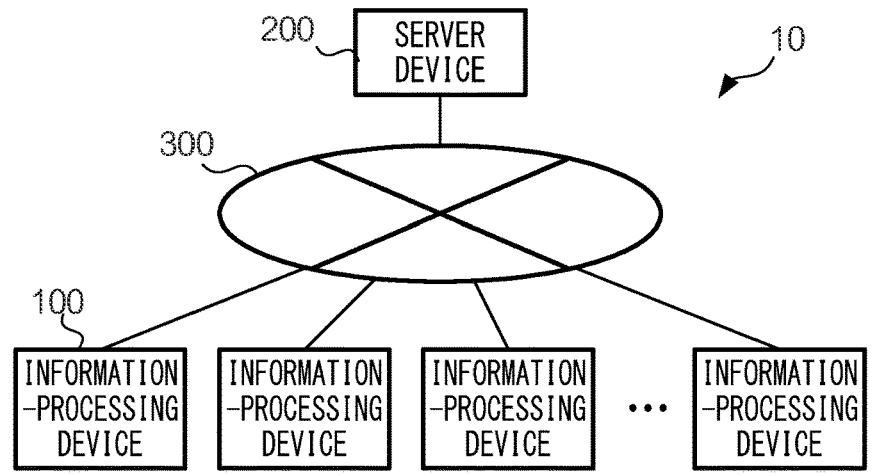
FIG. 1 shows an example configuration of an information-processing system.

FIG. 1 is a block diagram showing a configuration of information-processing system 10 according to the present exemplary embodiment. Information-processing system 10 includes plural information-processing devices 100 and server device 200. Information-processing devices 100 and server device 200 are coupled via network 300, which enables them to communicate with each other. Network 300 is a communication network such as the Internet or a mobile communication network. Network 300 may be a complex network including plural interconnected communication networks. Server device 200 is a computer device for relaying communication between information-processing devices 100. Server device 200 has a configuration of a typical server device. Server device 200 manages account information (described later) to associate a user with information-processing device 100.

Figure 2:
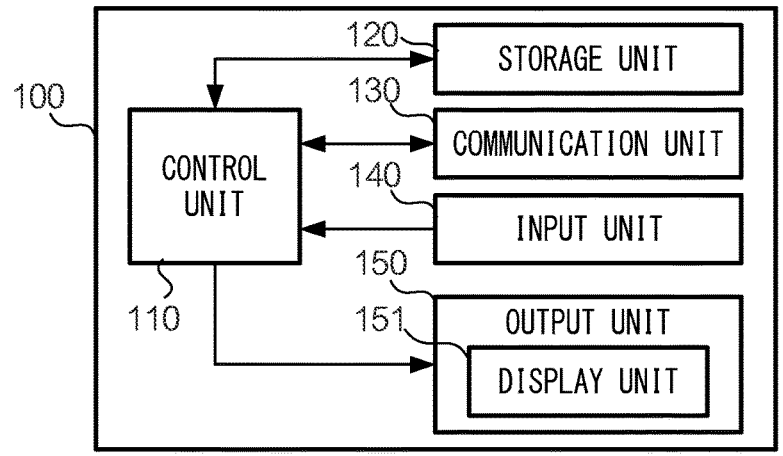
FIG. 2 shows an example of a hardware configuration of an information-processing device.

FIG. 2 is a block diagram showing a hardware configuration of information-processing device 100. Information-processing device 100 functions as a game machine including a communication function and a chat function in the present exemplary embodiment. Information-processing device 100 enables plural users to share the device. The term "plural users" herein refers to a predetermined relatively small number of users, and specifically refers to from several to dozens of users. In the present exemplary embodiment it is assumed that the plural users are family members. Information-processing system 10, specifically, includes at least control unit 110, storage unit 120, communication unit 130, input unit 140, and output unit 150. Output unit 150 includes display unit 151.

Control unit 110 is a unit for controlling operations of components of information-processing device 100. Control unit 110 includes a processing unit such as a central processing unit (CPU) and a main memory, and controls operations of the components by executing programs. Control unit 110, in the present exemplary embodiment, executes application programs such as a game program for controlling the progress of a game according to user's input operations, and a chat program for providing a chat function.

Control unit 110 also manages items of account information of a user, each of which is associated with an individual user. Account information includes information necessary for login, or specifically login authentication. Account information includes at least, for example, a set of an ID and a password, or substitute data. Account information may also include a name assigned to a user such as a nickname, or an image such as a photograph of a user's face or an avatar. Each user is associated by account information with one of information-processing devices 100 included in information-processing system 10.

Control unit 110 may include plural processors to execute distributed processing. Control unit 110 may cause the processors to share processes executed concurrently. Control unit 110 may, specifically, cause a processor to execute a game processing, while causing another processor to control communication with an external device.

Storage unit 120 is a unit for storing data. Storage unit 120 includes a storage medium such as a hard disk, and stores data such as account information, used by control unit 110. Storage unit 120 includes storage areas, each of which is assigned to an individual user. A storage area will be hereinafter referred to as "user area." Data stored in a user area, belonging to an individual user, will be hereinafter referred to as "user data." User data may include data saved using a saving function, or data on items used by a user in a game. User data may also include data on a monetary value, such as electronic money, usable in a network system including information-processing device 100 and an external device.

Storage unit 120 may include a removable storage medium such as an optical disk or a memory card, and a reader/writer for reading and writing data from/in the storage medium. The game program may be provided via a storage medium, or downloaded via communication unit 130 from an external device.

Communication unit 130 is a unit for exchanging data. Communication unit 130 exchanges data with an external device such as server device 200 or another information-processing device 100 via network 300. Communication unit 130 may directly communicate with a game machine without network 300.

Input unit 140 is a unit for inputting data. An input as used herein mainly refers to an input of data according to a user's input operation. Input unit 140 may, for example, include plural keys such as a keyboard or a keypad. Input unit 140 may alternatively include a pointing device such as a mouse, or a microphone to receive a user's voice input. Input unit 140 may alternatively include an acceleration sensor or a gyro sensor to receive a user's gesture input. Input unit 140 may include a unit, such as a fingerprint sensor or a camera, for receiving data necessary for login, such as data indicative of a physical feature such as a fingerprint or a face. Input unit 140 may include a video camera for having a video chat, described later.

Output unit 150 is a unit for outputting data. An output as used herein mainly refers to an output of data that can be perceived by a user. Output unit 150 may include a speaker or a vibrator, in addition to display unit 151. Output unit 150 may further include a light emitting diode (LED) lamp to notify a user of various types of information.

Display unit 151 is a unit for outputting visual data. Display unit 151 includes a display device such as a liquid crystal display or an organic electroluminescence (EL) display. Display unit 151 may function as a touch screen display to serve as a part of input unit 140. Display unit 151 may include plural screens.

Information-processing device 100 may be formed by a combination of plural devices among which the components are distributed. Information-processing device 100 may, for example, be formed by a combination of a main body including control unit 110, a controller including all or part of input unit 140 and output unit 150, and a device equivalent to display unit 151 such as a TV receiver.

The foregoing is a description of a hardware configuration of information-processing device 100. Thus configured information-processing device 100 executes a game program to control the progress of a game according to user's input operations. A user may play a game adapted according to personalized parameters by logging in before playing the game. A game play adapted to a user as used herein refers to a game play using user data or account information. Information-processing device 100 identifies a logged-in user to execute a game program using user data of the user, or to display account information of the user in a game.

Information-processing device 100 includes a chat function, which enables real-time communication between two or more information-processing devices 100. A chat is a type of messaging or message exchange. The chat function may enable exchange of text messages, or a video chat, which is exchange of videos and voices.

A user, who starts communication using the chat function, specifies a destination user and performs a predetermined input operation. Information-processing device 100 that has received the input operation sends a request for communication to information-processing device 100 of a destination user. The request will be hereinafter referred to as "communication request." The communication request includes information identifying the user who requests start of the communication and the destination user, such as an ID or a user name. The communication request is sent to destination information-processing device 100 via server device 200.

Information-processing device 100, when receiving a communication request, identifies a destination user to determine whether the destination user is a currently logged-in user. Information-processing device 100 executes a different processing depending on whether the destination user is the currently logged-in user. In the exemplary embodiment, when the destination user is the currently logged-in user, information-processing device 100 interrupts a game to display a pop-up screen, which prompts the destination user to respond to the communication request. On the other hand, when the destination user is not the currently logged-in user, information-processing device 100 merely displays a notification to the currently logged-in user, without interrupting a game, which notification informs him/her that a communication request addressed to the destination user has been sent. Information-processing device 100 may avoid interrupting a game, or namely displaying a pop-up screen, when the destination user is the currently logged-in user. Settings determining whether a game should be interrupted may be made manually on an application basis.

Figure 3:
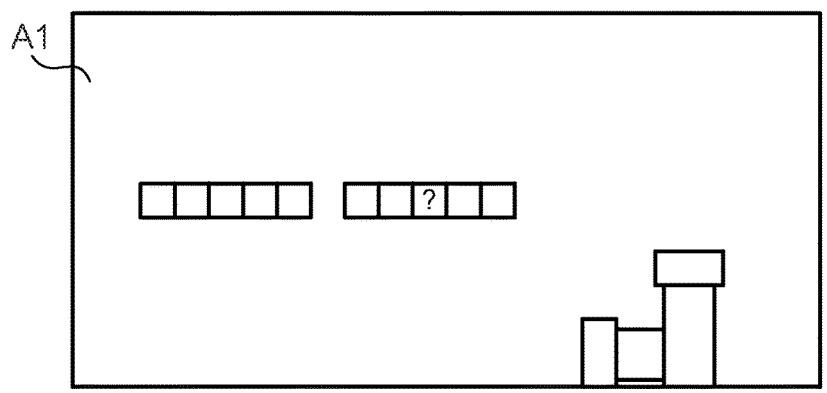
FIG. 3 shows an example of a display screen.
Figure 4:
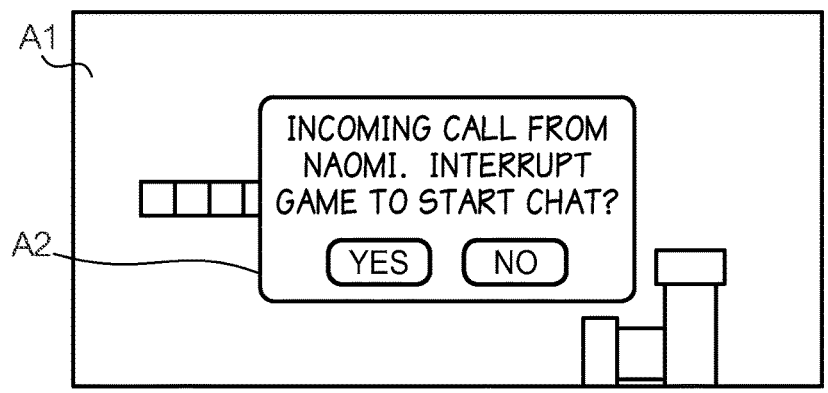
FIG. 4 shows an example of a display screen.
Figure 5:
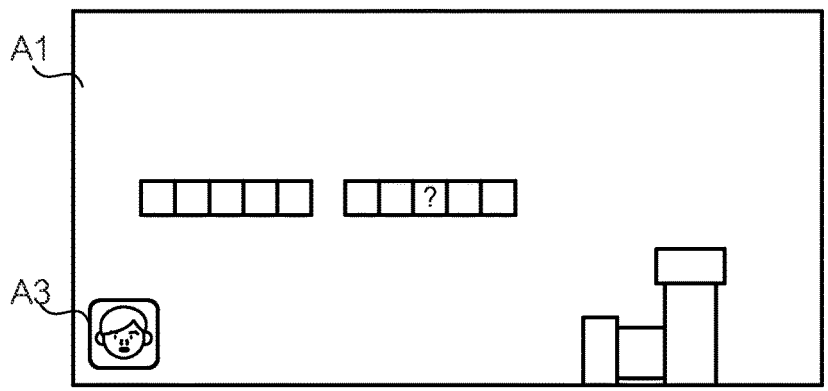
FIG. 5 shows an example of a display screen.

FIGS. 3, 4, and 5 are diagrams showing an example of a display screen displayed by information-processing device 100. FIG. 3 shows a display screen displayed before the communication request is received. FIGS. 4 and 5 show a display screen displayed after the communication request is received. FIG. 4 shows a display screen displayed when the destination user is a logged-in user. FIG. 5 shows a display screen displayed when the destination user is not a logged-in user.

Display of screen A1 shown in FIG. 3 is enabled by execution of a predetermined game program. Screen A1 will be hereinafter referred to as "game screen." Information-processing device 100 changes display of the game screen according to user's input operations. Information-processing device 100 may, for example, move a character or scroll the screen according to a user's input operation.

Information-processing device 100 displays the screen shown in FIG. 4 on receiving a communication request addressed to a logged-in user. The screen differs from the game screen shown in FIG. 3 in displaying dialogue box A2 on top of screen A1. Dialogue box A2 displays information indicative of a source user of a communication request, such as a user name, and buttons for enabling a user to select a subsequent processing, such as a "YES" button and a "NO" button shown in FIG. 4. The information indicative of a source user of a communication request is an example of information on receipt of a communication request.

Information-processing device 100, when a logged-in user selects the "YES" button in dialogue box A2, interrupts a running game program, and activates the chat function. When the user selects the "NO" button, information-processing device 100 continues a running game program. The term "activate" herein refers to making a function available, which may include bringing a program, such as a chat program, running in the background to the foreground, or starting a program.

Information-processing device 100 displays the screen shown in FIG. 5 on receiving a communication request addressed to a user other than a logged-in user. The screen differs from the game screen shown in FIG. 3 in displaying icon A3 on top of screen A1. Icon A3 is an icon displaying information that enables a logged-in user to identify a destination user. Icon A3 is an avatar image associated with a destination user in the present exemplary embodiment. Icon A3 differs from dialogue box A2 in not displaying information on a source user of a communication request. Icon A3 enables a user to identify a destination user, while preventing the user from identifying a source user. Information-processing device 100 may display a text identifying a destination user, instead of or in addition to icon A3.

Information-processing device 100 may display icon A3 in a size at a position such that the icon does not prevent a user from viewing screen A1. Alternatively, information-processing device 100 may display icon A3 translucently, which enables a user to see screen A1 through icon A3.

Information-processing device 100 may receive an input operation to select icon A3. On receiving the input operation, information-processing device 100 may activate the chat function. When doing so, information-processing device 100 may request a destination user to log in, and activate the chat function after the destination user's login.

Information-processing device 100, which has received a communication request addressed to a logged-in user, may notify the user of the receipt of the communication request by displaying an icon corresponding to the user, such as an avatar image, without displaying dialogue box A2. The displayed icon may differ in picture from icon A3, which is an icon displayed when a communication request addressed to a user other than a logged-in user has been received. When displaying the icon, information-processing device 100 may differentiate a display position, a size, or a color of the icon from that of icon A3, which enables a user to easily understand whether a communication address is addressed to him/her.

Figure 6:
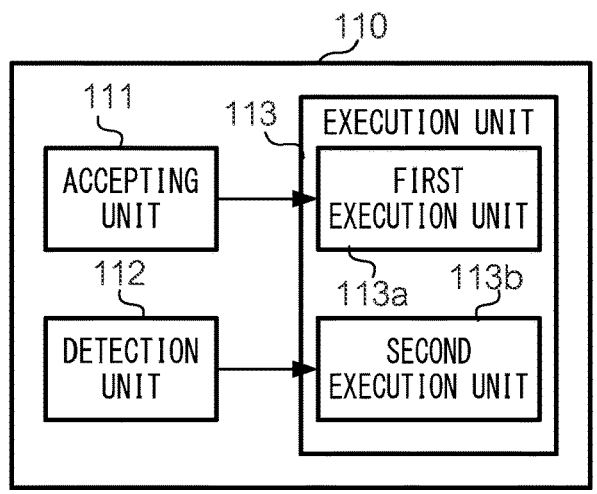
FIG. 6 shows an example of a functional configuration of an information-processing device.

FIG. 6 is a block diagram showing a functional configuration of information-processing device 100, enabling the notification described in the foregoing. Information-processing device 100 functions as accepting unit 111, detection unit 112, and execution unit 113, as shown in the drawing, by executing a predetermined program.

Accepting unit 111 is a unit for accepting a login from a user. Accepting unit 111 identifies a user based on account information stored in storage unit 120 to accept a login. A login method, in the present exemplary embodiment, may be any method that identifies a user, which may include authentication using an ID and a password, or biometric authentication using, for example, a fingerprint. In the present exemplary embodiment, users of information-processing device 100 are limited to family members, or in other words are predetermined users; therefore, a simple login method may be employed, whereby a user selects his/her user name or avatar in a displayed list.

Detection unit 112 is a unit for detecting receipt of data on a user. Detection unit 112 detects receipt of a communication request in the present exemplary embodiment. Detection unit 112 is able to detect receipt of another type of data, as described in a modification described below. Detection unit 112 is able to determine a destination of a received communication request in the exemplary embodiment. Detection unit 112 is therefore able to determine whether a received communication request is addressed to a logged-in user, whose login has been accepted by accepting unit 111, or whether a received communication request is addressed to a user other than a logged-in user.

Execution unit 113 is a unit for executing a processing. Execution unit 113 may be divided into first execution unit 113*a* and second execution unit 113*b* by function. First execution unit 113*a* is able to execute a processing according to a user subsequent to acceptance of login by accepting unit 111. First execution unit 113*a* may, for example, execute a game program using user data or account information, for a user who plays a game. First execution unit 113*a* is able to execute a processing according to a logged-in user's input operation. The processing executed by first execution unit 113*a* will be hereinafter referred to as "first processing" for convenience of explanation. The first processing is a processing of executing a game program in the present exemplary embodiment.

Second execution unit 113*b* executes a processing that is different from the first processing. The processing executed by second execution unit 113*b* will be hereinafter referred to as "second processing" for convenience of explanation. The second processing is, for example, a processing relevant to a notification of data, receipt of which has been detected by detection unit 112. Second execution unit 113*b*, specifically, executes a processing for notifying a user of receipt of a communication request.

Second execution unit 113*b* executes a processing according to a destination user of a communication request in the present exemplary embodiment. Second execution unit 113*b*, specifically, determines whether a destination user of a communication request is a logged-in user, and executes a different processing depending on whether the destination user is a logged-in user. Second execution unit 113*b*, for example, makes a different notification depending on whether a destination user of a communication request is a logged-in user, as shown in FIGS. 4 and 5.

Figure 7:
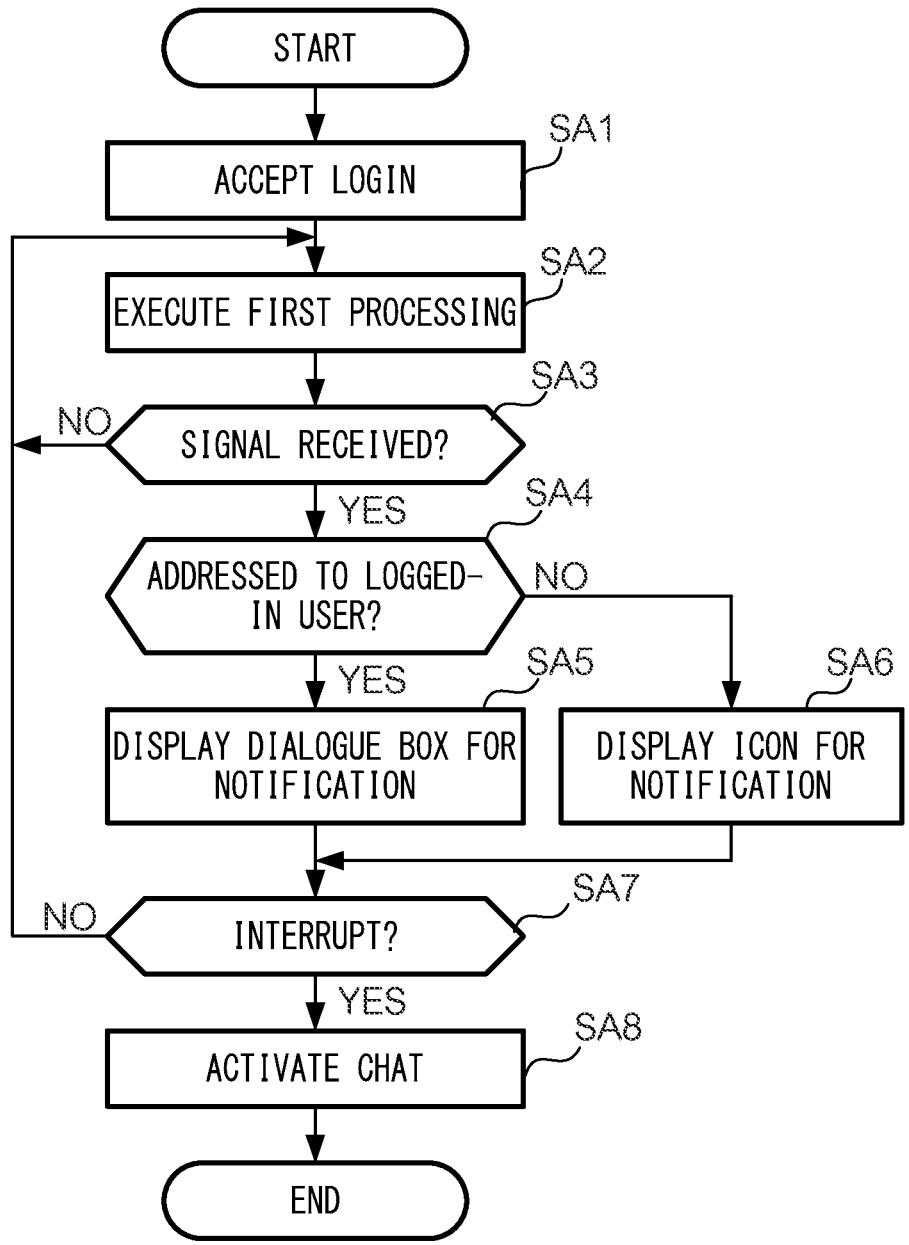
FIG. 7 shows an example of a flowchart showing a processing executed by an information-processing device.

FIG. 7 is a flowchart showing a series of processing executed by information-processing device 100, which enables a notification described in the foregoing. Control unit 110 of information-processing device 100 initially accepts a login from a user (step SA1). On accepting a login from a predetermined user, control unit 110 executes a first processing (step SA2). The first processing, in the present exemplary embodiment, is a processing of executing a game program according to user's input operations. Though not shown in FIG. 7, control unit 110 may reject a login from an unauthorized user.

Control unit 110, while running the first processing, determines whether a signal has been received from an external user, or namely a user not associated with the information-processing device (step SA3). Control unit 110 waits for receipt of a signal from an external user. Control unit 110 is able to detect receipt of a signal by detecting receipt of a communication request. A processing for detecting a communication request occurs as an interrupt processing. Control unit 110, when no signal has been received from an external user (step SA3: NO), continues the first processing until a signal is received from an external user.

When a signal has been received from an external user (step SA3: YES), control unit 110 refers to a communication request to determine whether a destination user is currently a logged-in user, or namely a user who has logged in at step SA1 (step SA4). Control unit 110 executes a different processing depending on whether the destination user is a logged-in user. Specifically, when the destination user is a logged-in user (step SA4: YES), control unit 110 notifies the user of the receipt of the signal addressed to the user by displaying a dialogue box illustrated in FIG. 4 (step SA5). On the other hand, when the destination user is not a logged-in user (step SA4: NO), control unit 110 notifies the logged-in user of the receipt of the signal addressed to the destination user by displaying an icon illustrated in FIG. 5 (step SA6). The processing of step SA6 corresponds to an example of a second processing according to the present exemplary embodiment.

When the processing of step SA6 has been carried out, the logged-in user would be able to call out to the destination user, if s/he is at home, and tell him/her that a signal addressed to the destination user has been received. The logged-in user may alternatively ignore the notification of the incoming signal if s/he wishes to continue the game, or the destination user is away from home.

Subsequent to the notification of step SA5 or SA6, control unit 110 determines whether to interrupt the first processing (step SA7). Control unit 110 interrupts the first processing in response to a user's input operation to start a chat. In other words, control unit 110 executes the first processing in parallel to another processing such as a second processing before interrupting the first processing.

When having decided to interrupt the first processing (step SA7: YES), control unit 110 interrupts the first processing and activates the chat function to enable the user to have a chat (step SA8). When doing so, control unit 110 may change users, as described above. Control unit 110 may interrupt the first processing after saving data on the game. Control unit 110, when deciding to continue the first processing (step SA7: NO), continues the first processing and waits again for receipt of a signal from an external user.

Though not shown in FIG. 7 as particular steps, the user may end the first processing or the chat whenever s/he wishes. Control unit 110 may continue running the first processing before receiving a user's input operation to end the first processing, if no signal has been received from an external user subsequent to the login at step SA1.

The present exemplary embodiment described in the foregoing would enable a user, if s/he is not logged in, to receive a notification of receipt of a signal addressed to him/her, from another user who is logged in.

The present exemplary embodiment enables a logged-in user to know a destination user of a communication request, while preventing him/her from knowing a source user of the communication request. This notification method protects privacy of the destination user of the communication request.

The present exemplary embodiment, which notifies a logged-in user of information to be notified to another user who is not logged in, may create an opportunity for conversation between users, or specifically family members. In other words, information-processing device 100, which is a game machine, may create an opportunity for conversation between users.

[Modifications]

The above exemplary embodiment is merely an example of possible embodiments. The above exemplary embodiment is not intended for limited interpretation. The above exemplary embodiment may be modified as described below. Any two or more of the following modifications may be combined with each other.

(Modification 1)

In the above exemplary embodiment, a notification may take any form other than display of information, or namely a notification of visual information. A notification, in the above exemplary embodiment, may take a form of vibration of the whole body or part of information-processing device 100 caused by a vibrator, or a predetermined reproduced sound. Information-processing device 100 may make different types of notification depending on a destination user of a communication request. Specifically, information-processing device 100 may make visual and sound notifications to a logged-in user, and make only a visual notification to a user other than a logged-in user. Information-processing device 100 may light or blink a lamp, or change a color of the lamp, according to a destination user of a communication request.

(Modification 2)

In the above exemplary embodiment, a first processing may be any processing, other than a processing of executing a game program, which differs from a second processing. In the above exemplary embodiment, a first processing may be any processing other than a processing started after a predetermined user's login. A first processing may be executed prior to a predetermined user's login. A first processing, in the above exemplary embodiment, may be any processing that is run at least subsequent to login. A first processing may be started prior to or subsequent to login.

(Modification 3)

In the above exemplary embodiment, receipt of any data may be detected other than the above communication request. In the above exemplary embodiment, receipt of any data may be detected, that is received to be used by a particular user.

In the above exemplary embodiment, receipt of a part of user data may be detected. Information-processing device 100 may, for example, notify a user of receipt of item data sent by another user as a present, which item data may be data usable in a particular game by a particular user.

Information-processing device 100 may inquire of server device 200 about an update or change of user data. Server device 200, when receiving present data from a user, stores the present data as user data in a storage area assigned to a destination user. Information-processing device 100 of the destination user may detect the update of the user data with reference to the storage area of server device 200, and execute a processing based on a result of the detection. In such a case, detection unit 112 described in the above exemplary embodiment may function as a unit for detecting an update of data on a user.

In the above exemplary embodiment, receipt of data may be detected, relating to different types of application programs, instead of a single application program. In such a case, information-processing device 100 that has detected receipt or update of data on a user, may notify a user of a type of application program that uses the data. When doing so, information-processing device 100 may, for example, display an image prepared for each type of application program, such as an icon, together with icon A3 shown in FIG. 5. Alternatively, information-processing device 100 may display the image and icon A3 alternately. The notification method enables a user to know an application program to which data relates, as well as a destination of data.

(Modification 4)

Information-processing device 100 may determine whether a source user of a communication request is a particular user, and execute a different processing based on a result of the determination. Information-processing device 100, for example, may determine a relationship between a source user and a destination user of a communication request. The relationship is, for example, human relationship in the real world. Information-processing device 100 may, for example, determine whether a source user and a destination user of a communication request are acquainted in the real world.

Classifying users into friend or not-friend is common in a game or a social networking service (SNS). A relationship of friends as used herein is established by an agreement of both users or an intention of one of the users, which relationship is pre-registered. Classifying users into friend or not-friend can apply to users, or specifically family members, of information-processing system 10 according to the above exemplary embodiment.

In the present modification, information-processing device 100 may determine whether a source user and a destination user of a communication request have a particular relationship such as friends, and execute a processing based on a result of the determination. For example, information-processing device 100, when a source user and a destination user of a communication request are not friends, may ignore the communication request, without notifying a user of receipt of the communication request.

(Modification 5)

Information-processing device 100 according to the above exemplary embodiment may be any device other than a game machine. Information-processing device 100 may be a general-purpose computer device such as a personal computer. Alternatively, information-processing device 100 may be a portable electronic device, or specifically a mobile communication terminal such as a tablet terminal or a smartphone.

The functional configuration shown in FIG. 6 may be provided by a single device or a system of plural cooperative devices in the above exemplary embodiment. The plural devices constituting the system may be coupled to each other via a network, as in the case of a pair of information-processing device 100 and server device 200. Alternatively, the plural devices may be coupled to each other via a means other than a network.

Information-processing device 100 may include plural display units in the above exemplary embodiment. Information-processing device 100 may display a different screen on each of the plural display units. Information-processing device 100 may, for example, display a first screen such as a game screen on a display unit, while displaying another screen such as a screen for informing receipt of a communication request or a chat screen on another display unit.

The above exemplary embodiment provides, in addition to an example of an information-processing device or information-processing system, an example of a notification method enabled by the device or system. A part or all of the functions according to the above exemplary embodiment may be provided in the form of a program. The program may be provided to an information-processing device via a storage medium such as an optical disk or a semiconductor memory, or may be downloaded to an information-processing device via a network such as the Internet.

What is claimed is:

1. A non-transitory storage medium storing a program for causing a computer to execute a process, the process comprising:
   accepting a login from a first user;
   detecting receipt of a chat request from a second user different from the first user;
   upon detecting receipt of the chat request, in response to matching of a destination of the received chat request and the first user who is logged in, displaying a first screen for notifying the receipt of the chat request, the first screen including a button for starting a chat with the second user, and in response to the destination of the received chat request and the first user who is logged in not being matched, displaying a second screen for notifying the receipt of the chat request, the second screen not including the button for starting a chat with the second user.

2. The non-transitory storage medium according to claim 1, wherein
   the second screen notifies the first user of information identifying the destination of the received chat request.

3. The non-transitory storage medium according to claim 2, wherein
   the second screen shows information associated with the destination of the received chat request.

4. The non-transitory storage medium according to claim 3, wherein
   the second screen shows an image of an avatar corresponding to the destination of the received chat request.

5. The non-transitory storage medium according to claim 1, wherein
   the second screen notifies the first user of the chat request, while preventing the first user from identifying the second user.

6. The non-transitory storage medium according to claim 1, wherein
   the first screen includes a dialogue box for notifying the receipt of the chat request, the dialogue box including the button for starting a chat with the second user, the dialogue box being placed on top of a game screen.

7. An information-processing device, comprising a computer processor configured to:
   accept a login from a first user;
   detect receipt of a chat request from a second user different from the first user;
   upon detecting receipt of the chat request, in response to matching of a destination of the received chat request and the first user who is logged in, displaying a first screen for notifying the receipt of the chat request, the first screen including a button for starting a chat with the second user, and in response to the destination of the received chat request and the first user who is logged in not being matched, displaying a second screen for notifying the receipt of the chat request, the second screen not including the button for starting a chat with the second user.

8. An information-processing system, comprising a computer processor configured to:
   accept a login from a first user;
   detect receipt of a chat request from a second user different from the first user;
   upon detecting receipt of the chat request, in response to matching of a destination of the received chat request and the first user who is logged in, displaying a first screen for notifying the receipt of the chat request, the first screen including a button for starting a chat with the second user, and in response to the destination of the received chat request and the first user who is logged in not being matched, displaying a second screen for notifying the receipt of the chat request, the second screen not including the button for starting a chat with the second user.

9. A notification method, comprising:
   accepting a login from a first user at an information processing system comprising a computer processor;
   detecting receipt of a chat request from a second user different from the first user;
   upon detecting receipt of the chat request, in response to matching of a destination of the received chat request data and the first user who is logged in, displaying a first screen for notifying the receipt of the chat request, the first screen including a button for starting a chat with the second user, and in response to the destination of the received chat request and the first user who is logged in not being matched, displaying a second screen for notifying the receipt of the chat request, the second screen not including the button for starting a chat with the second user.

* * * * *